Dec. 1, 1925.  
T. STENHOUSE  
1,563,935  
GLASS FEEDING APPARATUS  
Original Filed Aug. 12, 1920   2 Sheets-Sheet 1

Inventor  
Thomas Stenhouse.

By Howard A. Eccleston  
Attorney

Dec. 1, 1925.

T. STENHOUSE 1,563,935

GLASS FEEDING APPARATUS

Original Filed Aug. 12, 1920    2 Sheets-Sheet 2

Inventor
Thomas Stenhouse.

By Howard R. Eccleston
Attorney

Patented Dec. 1, 1925.

1,563,935

UNITED STATES PATENT OFFICE.

THOMAS STENHOUSE, OF WASHINGTON, PENNSYLVANIA, ASSIGNOR TO HAZEL-ATLAS GLASS CO., OF WHEELING, WEST VIRGINIA, A CORPORATION OF WEST VIRGINIA.

GLASS-FEEDING APPARATUS.

Application filed August 12, 1920, Serial No. 403,068. Renewed September 17, 1925.

*To all whom it may concern:*

Be it known that I, THOMAS STENHOUSE, a citizen of the United States, residing at Washington, in the county of Washington and State of Pennsylvania, have invented certain new and useful Improvements in Glass-Feeding Apparatus, of which the following is a specification.

My invention has for a general object to improve that type of glass feeding mechanism in which the flowing glass is temporarily received within cup forming members, the cup members being opened and the column of glass sheared when a sufficient quantity of glass for the article required has been gathered in the cup.

A further object of my invention is to pivotally mount both the cup members and the shears, and to position the cup members close to the discharge orifice and to position the shears above and close to the cup members, thus preventing the usual spiral formation caused by a long stream, which becomes attenuated when a long drop is required.

A further object of my invention is to combine shears of a particular shape with the oscillating cup members, the shears being shaped to surround the glass column during the cutting operation.

Still another object of my invention is to provide new and improved means for maintaining a proper shearing contact between the shear blades.

With the above general objects in view and others, which will be obvious to those skilled in the art from the description hereinafter, my invention consists in the features, details of construction, and combination of parts which will first be described in connection with the accompanying drawings and then particularly pointed out in the claims.

Figure 1:
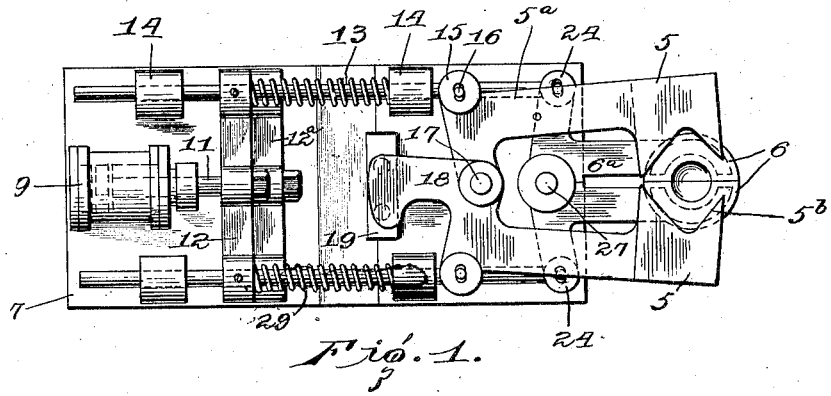
Figure 1 is a plan view of the mechanism showing the shears in open position and the cup members in closed position.
Figure 2:
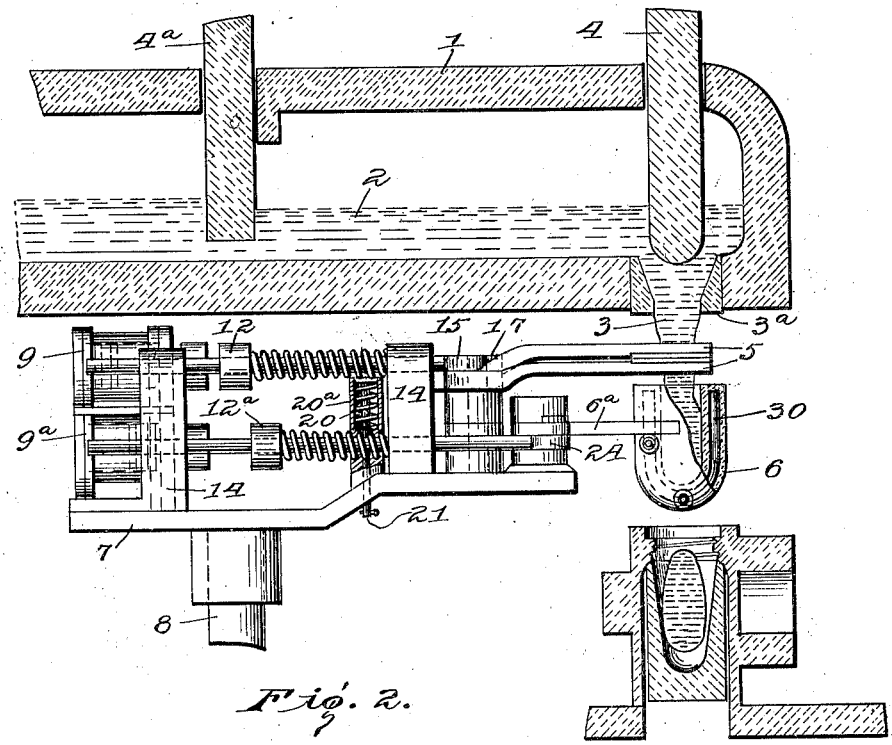
Figure 2 is a side elevation of the mechanism combined with the tank extension, showing the removable bushing and regulating plug; the shears being open and the cup members closed as before.
Figure 3:
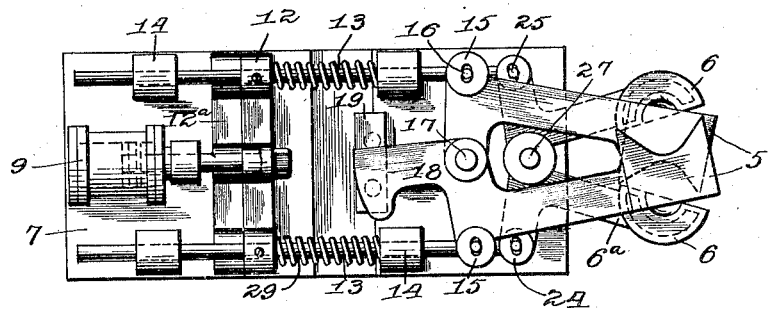
Figure 3 is a plan view of the mechanism with the elements thereof in reversed position, the shears being closed and the cup members open.
Figure 4:
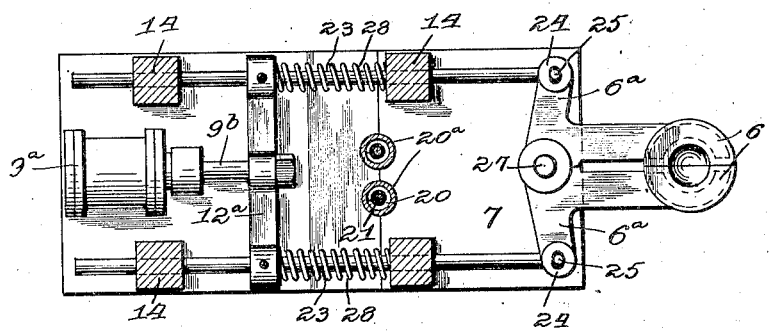
Figure 4 is a plan view of the apparatus with the shears and operating mechanism therefor removed to clearly show the cup operating mechanism.

In the construction illustrated in the above figures numeral 1 refers to a flow spout or tank extension into which the glass 2 flows in the direction of the outlet orifice indicated by numeral 3. Removably mounted within the orifice 3 is a bushing $3^a$, providing means whereby the bushing may be renewed when necessary, or other bushings having apertures of various dimensions suitable to the requirements of the articles to be made, may be substituted therefor.

For further regulating the flow of glass a vertically adjustable plug 4 is mounted in alignment with the discharge orifice; while an auxiliary control or sluice gate $4^a$ is provided within the spout 1 for still further regulating the glass flow, or for entirely shutting off the flow during renewal or change of the plug 4 or bushing $3^a$. It will be understood, of course, that the well known reciprocating plug may be substituted for the adjustable plug 4, if so desired.

For supporting the shears, the cup forming members, and the operating mechanism, I provide a base plate 7, which may be secured in place in any desirable manner as by a column 8 received within a suitable support.

Mounted below, in line with, and adjacent to the discharge orifice 3 are the shear blades 5, 5, the blades being carried by bell-crank levers $5^a$, $5^a$, pivoted upon a pin 17.

For actuating the shears a cylinder 9 operated by air or other fluid medium is mounted on the base plate 7. The piston rod 11 of this cylinder carries a crosshead 12 which is connected with the slide rods 13, 13, in any desired manner, as by pins or set screws, the rods being slidably supported in bearings 14, 14. These rods terminate in slotted lugs 15, 15, adapted to receive pins 16, 16, whereby the motion of the slide rods is transmitted to the bell-crank levers and hence to the shear blades. Coil springs 29, 29, are located between the forward bearings 14, 14, and the crosshead 12, and for the purpose of convenience may be mounted on the slide rods 13, 13, as shown.

The operation of the mechanism thus far described is obvious. If pressure is admitted to the cylinder 9 on the side of the piston to force the piston rod outward (to the right as shown in the drawings) then the crosshead carried thereby and the slide rods 13, 13, to which the crosshead is connected, will be moved to the right; and by means of the pin and slot connection between the slide rods and the bell-crank levers 5ª, 5ª, the latter will be caused to rotate thereby closing the shear blades 5, 5. If now the pressure is released from the cylinder by any suitable means, the springs 29, 29, will force the crosshead, the slide rods, and the piston rod to the left, thereby rotating the blades to open position.

As shown at 5ᵇ the blades of the shears are so shaped that they will surround the glass column during the cutting operation.

In order that a proper shearing contact may be maintained between the blades at all times, I provide the lever of the upper blade with an extension 18, having a planed surface in frictional contact with a plate 19. This plate has downwardly extending pins 21, 21, attached thereto, which may be slidably mounted within sleeves 20ª. To hold the plate in tension against the lever I mount coil springs 20, 20, on the pins 21, 21, the springs resting at their lower ends on shoulders formed in the sleeves 20ª, and forcing the plate upward against the lever.

Mounted below the shears and adjacent thereto are cup forming members 6, 6, which when brought together form a cup closed at the bottom, and adapted to temporarily receive a quantity of molten glass. When the required amount has been received therein the glass column is sheared and the cup members opened to drop the severed glass into a mold or other receptacle.

As the cup operating mechanism is substantially the same as the shear operating mechanism previously described, only a brief description thereof will be necessary. The cup members are carried by bell-crank levers 6ª, 6ª, pivotally mounted on a pin 27. An operating cylinder 9ª is supported on the base plate, and the piston rod 9ᵇ of said cylinder is connected with a crosshead 12ª, which is attached by suitable means to the slide rods 23, 23, supported in bearings 14, 14. The slide rods have slotted lugs 24, 24, at the ends thereof, the slots being adapted to receive pins 25, 25, carried on the bell-crank levers supporting the cup members. Coil springs 28, 28, may be mounted on the slide rods between the forward bearings 14, 14, and the crosshead 12. When the piston rod is forced to the right by pressure being admitted to the cylinder 9ª, the crosshead 12ª, and slide rods 23, 23, will also move to the right against the pressure of springs 28, 28, and by the slot and pin connection with the levers 6ª, 6ª, will cause the cup members to be brought together. Upon the release of the cylinder pressure the springs 28, 28, will move the cup members to open position.

The cup forming members may be provided with a suitable water cooling cavity shown in dotted lines and indicated by numeral 30, and also with the usual pipe connections.

The operation of the entire mechanism will now be described.

The glass 2 flows from a tank into the flow spout or tank extension 1 and is discharged through the orifice 3 lined by a bushing 3ª, which assists in controlling the size of the discharging column of glass. The flow is further controlled and regulated by the vertically adjustable plug and sluice gate previously described.

The flowing glass column is arrested by and received within the cup temporarily until the amount required for the work at hand has been gathered. The pressure is now released from cylinder 9ª and the action of the springs 28, 28, forces the crosshead 12ª and slide rods 23, 23, to the left thereby swinging the cup members apart to drop the glass in the direction of the mold or other receptacle. At the same time pressure is admitted to the cylinder 9 to force the piston to the right thereby closing the shears and severing the glass as described previously. The operation is now reversed, pressure being admitted to cylinder 9ª to close the cup members and at the same time the pressure being released from the cylinder 9 so that the springs 29, 29, may open the shears.

Instead of operating the shears and cup members simultaneously in opposite directions, I may, if desired, first open the cups and then sever the glass; or I may first sever the glass and then open the cups.

Any suitable valve mechanism (not shown) may be used for controlling the admission and exhaust of fluid pressure to the cylinders 9 and 9ª.

In accordance with the patent statutes I have described what I now believe to be the best embodiment of the invention, but I do not wish to be understood thereby as limiting myself or the scope of the invention, as many changes and modifications may be made without departing from the spirit of the invention, all such I aim to include in the scope of the appended claims.

Having fully described my invention, what I claim as new and desire to secure by Letters Patent is:

1. Glass delivering and cutting mechanism including a pair of cup forming members pivotally mounted adjacent to the flow orifice and adapted to oscillate in substantially a horizontal plane, shears pivotally mounted above and adjacent to said cup forming members and adapted to oscillate in substantially a horizontal plane, said shears being shaped to surround the glass column during the cutting operation.

2. Glass delivering and cutting mechanism including a pair of cup forming members pivotally mounted and adapted to oscillate in substantially a horizontal plane, shears pivotally mounted above and adjacent to said cup forming members, and resilient means for maintaining proper shearing contact between the shear blades.

3. Glass delivering and cutting mechanism including a pair of cup forming members pivotally mounted and adapted to oscillate in substantially a horizontal plane, shears mounted above and adjacent to said cup forming members, one blade of said shears having an extension thereon, a plate frictionally engaged by said extension whereby the blades are maintained in proper shearing contact.

4. Glass delivering and cutting mechanism including a pair of cup forming members, shears mounted above said cup forming members, one blade of said shears having an extension thereon, a spring pressed plate frictionally engaged by said extension whereby the blades are maintained in proper shearing contact.

5. Glass delivering and cutting mechanism including a pair of pivotally mounted cup forming members, shears pivotally mounted above and adjacent to said cup forming members, the shear blades shaped to surround the glass column, and means for separately and independently operating the cup forming members and shears.

6. An apparatus of the character described including pivotally mounted cup forming members, bell-crank levers carrying said cup members, slide rods operatively connected to said bell-crank levers; a crosshead connecting said slide rods, and means for operating said crosshead.

7. An apparatus of the character described including pivotally mounted cup forming members, bell-crank levers carrying said cup members, slide rods operatively connected to said bell-crank levers, a crosshead connecting said slide rods, spring members for moving the crosshead in one direction and a fluid operated piston for moving the crosshead in the opposite direction.

8. An apparatus of the character described including pivotally mounted cup forming members, pivotally mounted shears, and means for operating said shears, said means including bell-crank levers carrying said shears, slide rods operatively connected with said levers, a crosshead connecting the slide rods, and means for operating said crosshead.

9. An apparatus of the character described including pivotally mounted cup forming elements, pivotally mounted shears, and means for operating said shears, said means including bell-crank levers carrying said shears, slide rods operatively connected with said levers, a crosshead connecting the slide rods, spring members for moving the crosshead in one direction and a fluid operated piston for moving the crosshead in the opposite direction.

10. An apparatus of the character described including pivotally mounted cup forming members, and pivotally mounted shears, means for operating said cup members, said means including bell-crank levers carrying the cup members, slide rods operatively connected with the levers, a crosshead connecting the slide rods, means for operating the crosshead; means for operating said shears, said means including bell-crank levers carrying the shears, slide rods operatively connected to the levers, a crosshead connecting the slide rods and means for operating the crosshead.

11. An apparatus of the character described including pivotally mounted cup forming members, and pivotally mounted shears, means for operating said cup members, said means including bell-crank levers carrying the cup members, slide rods operatively connected with the levers, a crosshead connecting the slide rods; means for operating said shears, said means including bell-crank levers carrying the shears, slide rods operatively connected with the levers, a crosshead connecting the slide rods and separate and independent means for operating the two crossheads.

THOMAS STENHOUSE.